United States Patent Office 2,920,832
Patented Jan. 12, 1960

2,920,832

IMPROVING CLAY BRIGHTNESS BY FLOTATION AND FINE GRINDING

James B. Duke, Metuchen, N.J., assignor to Minerals & Chemicals Corporation of America, Menlo Park, N.J., a corporation of Maryland No Drawing. Application December 16, 1957
Serial No. 702,820

13 Claims. (Cl. 241—23)

This invention relates to a process for concomitantly improving the brightness and attaining particles of extremely minute particle sizes from relatively coarse and discolored clay by a novel sequence of steps. Pursuant to the invention a coarse fraction of kaolin clay, discolored by what is considered to be essentially titaniferous material, is subjected to a combination of steps which cooperate to produce a product having qualities for use as a paper-coating pigment comparable to those of certain high-grade imported sedimentary clays which are distinguished for their whiteness and fineness and are superior to the highest grade domestic kaolin clays processed by prior art methods. Such a coarse fraction of kaolin clay is obtained during the classification of kaolin clay and is considered to be a waste fraction thereof.

The terms "kaolin" or "kaolin clay" as used herein refer to those clays which include in the raw state as a principal mineral constituent at least one of the following: kaolinite, halloysite, annauxite, nacrite, dickite or indianite. These minerals are hydrous aluminum silicates generally represented by the formula

$$Al_2O_3 \cdot 2SiO_2 \cdot nH_2O$$

$n$ usually being 2. The weight ratio of silica to alumina is about 1.0–1.5 to 1, and most generally about 1.18 to 1.

The use of kaolin clays in the production of high-grade paper coatings has been restricted to date to those expensive finely-particulated kaolin clays having high brightness as measured by the standard General Electric brightness tester. Such clays may be obtained from certain deposits of sedimentary clay found abroad, or in the case of domestic sources by fractionating relatively bright primary clay to separate therefrom a fine fraction suitable after an additional bleaching operation for use in paper coatings. The suggestion has been made in U.S. Patent No. 2,569,680 to T. G. Leek to subject a clay, particularly a fine sedimentary clay dark because of the accretion of certain ferruginous and titaniferous matter, to a froth flotation agent in the presence of certain negative and positive-ion reagents to float off such impurities and to deliver in the tailings a clay relatively free from impurities. Considerable brightening results from such a process, particularly when such a process is used in conjunction with both a preliminary sedimentation or settling treatment whereby relatively large particles of coloring matter are removed. Brightness is further improved by a bleaching operation, preferably following the froth flotation, in which the clay is treated with zinc dust and sulfur dioxide gas or zinc hydrosulfite, washed, filtered and dried. Although by the practices taught by Leek the brightness of a given clay may be increased considerably, by as much as 5% or more, nevertheless the product does not have adequate brightness for some high-grade paper coating use when the clay prior to treatment has a very low brightness. It would be expected that improved brightening of the beneficiated clay would result by fine grinding the clay prior to the froth flotation process of Leek's invention. I have found, however, that this does not happen. On the contrary the flotation operation loses much of its efficiency when applied to a clay containing a substantial fraction of particles smaller than about 3.5 microns. Hence the practices taught by Leek fail to teach a method for upgrading coarse colored clay fractions to the fineness and brightness required of kaolin for paper coating use.

The instant invention is the result of my discovery that the brightness of a coarse kaolin clay highly colored by titaniferous (probably anatase) or titaniferous and feruginous matter may be brightened to heretofore unattainable brightness while simultaneously reducing that clay to a controlled micron particle size within a selected range by: subjecting a dispersion of the coarse clay to a froth flotation process in the presence of an anionic collector whereby a substantial portion of the colored impurities are selectively floated from the clay and the beneficiated clay from the flotation is subjected to grinding of a character such that disintegration results from the attrition of clay particles and in some cases attrition plus impact. The invention provides an economical means of enhancing the value of unmarketable coarse kaolin clay to fine white clay suitable for use as a paper coating pigment, in textile treatment, cosmetics or the like.

The clay treatment of the subject invention can be used in lieu of a chemical bleaching step, or, more preferably, bleaching may be used as an adjunct to the treatment in which case even further improvement in brightness of the final product is achieved.

Accordingly it is a principal object of the instant invention to provide a novel and economical method of brightening coarse kaolin clays to a greater extent than heretofore practiced.

It is another important object to provide a method to brighten kaolin clay and concomitantly reduce the particle size of the kaolin to a controlled size within a selected range of particle sizes.

It is another object to provide a novel economical means for brightening coarse kaolin, particularly waste fractions thereof, and simultaneously finely-divide the clay to up-grade that material.

Briefly, I have discovered that a valuable highly particulated clay displaying superior brightness can be produced from a coarse darkened essentially useless fraction of clay by subjecting that coarse clay to a flotation in the presence of a flotation agent selective to the impurities in the clay whereby color-bodied impurities are mechanically separated from said coarse clay to yield a beneficiated clay and subjecting the thus beneficiated clay to fine-grinding of such a character that the beneficiated clay particles are reduced in particle size by attrition, preferably by subjecting said particles while dispersed in a fluid stream to high velocity and turbulence. The sequence of steps above recited is critical in the practice of my invention, i.e., the outstanding clay product is not achieved by grinding the clay to the desired particle size prior to flotation. I have found that the specific flotation operation within the scope of the invention is most beneficially applied to a kaolin clay in which the average particle size is greater than about 2 microns. For example, when the clay feed contains more than about 30 percent of minus-2-micron (equivalent spherical diameter) particles and more than about 15 percent by weight of minus-1-micron particles the outstanding increase in brightness is not achieved. Hence beneficiating a previously finely-ground material is not the equivalent in terms of ultimate brightness attained as subjecting a beneficiated relatively coarse feed to fine-grinding of the character hereinafter described. I have found that the feed to the fine-grinding apparatus of the preferred character is preferably a relatively coarse material, preferably a relatively coarse particle size of kaolin with an average particle diameter less than about 44 microns and in the neighborhood of 2 to 10 microns (as measured by well known soil hydrometer techniques).

The preferred froth flotation method, from the standpoint of performance and economy, is that in which the coarse dispersed clay feed is treated with negative-ion reagents and preferably in the presence of an auxiliary agent from the group of soluble sulfates consisting of ammonium sulfate, magnesium sulfate and potassium sulfate, other soluble sulfates not giving the best results. The amount of auxiliary agent used is not critical, it having been found that from about 0.5 to 10 pounds per ton (dry feed basis) is usually sufficient. Any well-known negative-ion collector such as a fatty acid, or mixtures containing a fatty acid salt may be used. Suitable negative-ion reagents include tall oil (oleic acid product or vegetable origin usually associated with resin acids), red oil (oleic acid of animal origin), linoleic acid or sulpho-oleic-acid. The flotation operation should be carried out on an alkaline pulp, preferably adjusted to a pH of from about 8 to 10. The pH of the pulp should preferably be adjusted by a hydroxide of the cation of the particular sulfate employed. For example, ammonium hydroxide is the preferred alkaline agent when ammonium sulfate is the auxiliary agent, etc. However, in the case where magnesium sulfate is used as the auxiliary agent the corresponding hydroxide cannot be employed because of its relatively poor solubility in water and hence some other alkaline material, as for example sodium hydroxide, should be used. The feed is ordinarily pulped with water to a concentration of from about 5 to 25 percent solids, and preferably 10 to 15 percent solids.

In order to obtain the desired results it is necessary to disperse the clay prior to beneficiation with the flotation reagents, the dispersion being accomplished with dispersing agents well-known to those skilled in the art, as for example, sodium silicate, sodium carbonate, etc.

Although the preferred collector is a negative-ion reagent it will be understood that it is within the scope of the invention to use as the collector an emulsion containing both negative-ion and positive-ion reagents, as taught by Leek in U.S. Patent No. 2,569,680. The requirement of the collector is that it be of such a character that the impurities be selectively floated. The processing difficulties inherent in the use of a cationic collector mitigate against its use as the sole collector in the process of the invention.

The clay is preferably bleached in addition to treatment by flotation and disintegration. The bleaching may be performed prior to or subsequent to the flotation or as the last step.

The beneficiated coarse clay particles are pulverized by subjecting a flowing stream of discrete particles thereof dispersed in an elastic fluid to high velocity and turbulence in an enclosed space. The preferred method of accomplishing this pulverization is by forcing a slurry of the beneficiated clay in a vaporizable liquid into and through an elongated tubular heating zone, vaporizing at least a portion of the liquid component of the slurry during passage through the heating zone to form a flowing stream of a dispersion of coarse clay particles in the resulting vapor, and subjecting the dispersion to high velocity flow and turbulence to effect disintegration of the coarse particles. The process is described in detail in U.S. Patent No. 2,735,787 to Du Bois Eastman et al. In accordance with the practices taught therein coarse granular particles are first suspended in a vaporizable liquid to form a free-flowing slurry, the term "free-flowing slurry" designating a suspension of solid particles in liquid in such proportions that the suspension exhibits the general flow properties of a liquid in that it will flow through a downwardly extending conduit under the influence of gravity. The flowable mixture is continuously fed as a confined stream into a heating zone in the initial portion of a heated tube of substantial length compared to its inside diameter. In the tube the liquid component of the slurry is heated to a temperature well above its boiling point at the pressure existing in the tube, thereby forming a dispersion of solids in vapor which flows turbulently at high velocity through the latter portion of the tube to accomplish the grinding. The tube is sufficiently long to provide for the vaporization of the liquid and to provide a subsequent section of sufficient length to provide for the grinding of solids of the gasiform dispersion when passing therethrough. The slurry of beneficiated clay is, in an aspect of this embodiment of the invention, the aqueous slurry of machine-discharge clay from the flotation apparatus with the solid contents readjusted when necessary to the highest percentage by weight consistent with smooth function of the grinding process. Heating requirements and costs are thus reduced. A deflocculating agent may be added to the slurry and be distributed therethrough to lower the viscosity thereof. Examples of deflocculating agents which may be used are tetrasodium pyrophosphate, disodium dihydrogen pyrophosphate and sodium hexamethaphosphate. Suitable solids content of the slurry will be about 15–40 percent by weight.

Although, as above mentioned, in the particular process water is the preferred vaporizable liquid, volatile organic liquids may be used alone or where the organic liquid is water-miscible in admixture with water.

The process for fine-grinding a fluid dispersion of beneficiated clay is susceptible to numerous variations without departing from the spirit and scope of the invention. For example, clay particles pulverized in the manner above described may be further disintegrated by impinging the said pulverized clay particles while still in the form of discrete dispersed particles in high velocity flow onto plates or discs. In another embodiment the liquid slurry is heated to a high temperature while maintaining the pressure in the critical region and thereafter instantaneously reducing the pressure on the slurry as for example by passing it through an orifice or a Venturi to form a flowing stream of dispersed particles in vapor, the method being treated in U.S. Patent No. 2,763,434 to D. M. Strasser. The dispersion thus produced is subjected to high velocity and turbulence to effect pulverization. The process may be modified by passing the dispersion of pulverized clay to a fluid energy mill. The fluid in which disintegrated particles are entrained, may be condensed upon exit from the pulverizer and separated from the clay or, when the vaporizable liquid is water, it may be condensed and collected with the attrited clay.

A preferred method of executing the discharge is to discharge the stream of dispersed pulverized clay particles into a stream of water whereby the resultant slurry may be subjected to wet-clasification, such as for example centrifugation. Another method of pulverizing the beneficiated clay is by impingement of a jet of gas in which particles of the coarse clay are suspended against either a second such stream or a jet of high velocity gas to develop turbulence therein with resultant disintegration of particles. This gasiform dispersion is preferably made by vaporizing the liquid component of the pulp of beneficiated clay in an elongated zone of restricted cross-section.

Conventional fluid energy milling wherein solid particles are directly entrained in a flowing stream of gas and circulated through an enclosed system confers some size reduction and additional brightness to the beneficiated clay although the results do not measure up to those obtained when the gasiform dispersion of beneficiated clay is subject to turbulence at high velocity. Likewise, some enhancement in particle size and brightness of the beneficiated coarse clay results from recirculating a stream of particles dispersed in a fluid through an apparatus including serpentine and linear passages to provide alternating passages of fluid and turbulent flow. Such an apparatus and method is described in U.S. Patent No. 2,792,114 to C. H. Kidwell et al.

Following are examples which illustrate certain embodiments of my invention. These examples are included for illustrative purposes only and are not to be construed as limiting the invention to the particular modifications of said invention disclosed therein.

EXAMPLE

This example illustrates the improvement in the brightness of kaolin which has been treated by the practice of the instant invention over kaolin which has been brightened by only flotation and/or bleaching. The example further illustrates that the attainment of particles of extremely minute sizes and within a selected range is concomitant to enhancement of brightness.

A coarse kaolin clay was beneficiated and the beneficiated product was finely-ground to obtain a product having a bleached brightness index of about 90.5%. Fractionation of this product produced a fine fraction, that is one in which the particles were substantially all of minus 3.0 micron, having a bleached brightness of 92.5%, a brightness comparable to the highest grade imported clay. Briefly, the treatment comprised subjecting the coarse discolored clay to froth flotation and subjecting the improved product therefrom to fine-grinding by subjecting said product as a dispersion in water vapor to turbulence. The product thus reduced in particle size was dispersed in water using tetrasodium pyrophosphate and fractionated by sedimentation into a minus-3 micron fraction and a plus-3 micron fraction, the coarse fraction being separately recycled through the reduction apparatus and again fractionated.

A 2500 gram sample (dry weight basis) of a relatively coarse fraction of a dispersed water-washed Georgia kaolin (in the form of a 24.4 percent solids slip) was pulped with water into a 5000-gram laboratory Minerals Separation Airflow Flotation Machine to a concentration of about 10 percent solids. The kaolin of this example comprised particles of such size distribution that about 44 percent by weight were coarser than 7 microns in equivalent spherical diameter and about 15 percent by weight were coarser than 15 microns in equivalent spherical diameter.

The kaolin pulp was conditioned in the flotation machine with air off for 5 minutes using 5 pounds of ammonium sulfate, 4 pounds of ammonium hydroxide and 2.5 pounds of tall oil, all in pounds per ton of dry feed. Air was then admitted to the machine and a highly colored froth product was removed for 10 minutes. The clay pulp remaining in the machine was again conditioned without aeration for 5 minutes after adding an additional 1 pound of ammonium hydroxide and 0.5 pound of tall oil, after which air was admitted and a second froth product removed for 10 minutes. The pH of the pulp was maintained at 9 throughout the conditionings and flotations. The final machine discharge was a brightened kaolin product considerably lower in $TiO_2$ content than the original feed as can be seen from the following metallurgical results (Table I).

Table I

VOLATILE FREE BASIS

| | Percent Weight | Percent $TiO_2$ | Percent $Fe_2O_3$ | Percent Distribution of $TiO_2$ |
|---|---|---|---|---|
| Kaolin Feed (unbleached) | 100.0 | 1.19 | 0.33 | 100.0 |
| First Froth | 20.6 | 4.89 | 0.48 | 83.5 |
| Second Froth | 2.6 | 0.68 | 0.29 | 1.7 |
| Machine Discharge | 76.8 | 0.24 | 0.28 | 14.8 |
| Feed (bleached) | | 1.18 | 0.21 | |
| Tailings (bleached) | | 0.26 | 0.18 | |

The flotation machine discharge (beneficiated kaolin) was adjusted to a 25% solids aqueous slip and subjected to fine grinding by continuously pumping the slip at rates of 7 to 10 gallons per hour through an elongated pressure tube heated throughout its length to maintain a discharge of kaolin particles suspended in superheated steam ranging in temperature from 840° F. to 1010° F. at pressures of 200 to 1550 pounds per square inch gauge. It will be recognized that these conditions were well under the critical pressure of 3221 p.s.i.g. and above the critical temperature of 705° F. for water vapor, thus assuring the presence of dry superheated steam at high turbulent velocities in the tube. The pressure tube was discharged into cooled water thus effecting a condensation of the steam and the recovery of the ground or disintegrated kaolin as a suspension in water. Particle size distribution analysis were carried out on dispersed aqueous suspensions of the feed to and the product from this operation using well known hydrometer settling techniques. The results of these analyses are listed in the first three columns of Table II, and show the pronounced particle size reduction which was obtained.

The aqueous suspension of the product from the described primary run was separated into coarse and fine fractions by sedimentation with the results shown in columns four and five of Table II. It will be seen that the fine fraction amounted to 53.5% of the weight of the dry feed to the original flotation operation, and contained particles of kaolin which were 97% finer than 5 microns and 83% finer than 2 microns.

The coarse fraction from the product of the primary grinding run was put through the heated pressure tube apparatus again under conditions similar to those described for the first run. The yields and particle size distribution analysis of the screen product and its sedimented fractions are shown in columns six, seven, and eight of Table II. It is apparent from the results in column eight that rerunning the coarse fraction through the grinding step increased the yield of the fine fraction.

Table III, illustrates the outstanding brightness of the clay which is achieved by the practice of my invention. All of the weights therein are reported on a volatile-free basis, volatile-free weight being the weight of the clay after heating said clay at a temperature of about 1700° F. to essentially constant weight. Brightness is tested by TAPPI Standard Method T-646 as described Table II

PARTICLE SIZE DISTRIBUTION ANALYSIS OF FINE GRINDING OPERATION

| Microns | Percent Finer Than— | | | Rerun of Coarse Fraction from Primary Run | | |
|---|---|---|---|---|---|---|
| | Primary Run | | Fractionated Product | | Fractionated Product | |
| | Feed | Product | Coarse | Fines | Product | Coarse | Fines |
| 50 | 100 | 100 | 100 | 100 | 100 | 100 | 100 |
| 40 | 99 | | 100 | 97 | 99 | 100 | |
| 30 | 97 | 96 | 100 | 97 | 99 | 100 | |
| 25 | 95 | 96 | 100 | 97 | 98 | 100 | 95 |
| 20 | 91 | 96 | 99 | 97 | 97 | 100 | 95 |
| 15 | 85 | 95 | 98 | 97 | 96 | 96 | 95 |
| 10 | 72 | 93 | 90 | 97 | 92 | 90 | 95 |
| 7 | 56 | 88 | 76 | 97 | 86 | 78 | 95 |
| 5 | 40 | 83 | 56 | 97 | 77 | 58 | 94 |
| 2 | 11 | 63 | 14 | 83 | 14 | 12 | 80 |
| 1 | 5 | 44 | 5 | 55 | 23 | 3 | 49 |
| Yield,[1] percent weight | 75.8 | 75.8 | 22.3 | 53.5 | 22.3 | 9.7 | 12.6 |

[1] Based on 100% dry feed to the flotation operation.

on pages 159A and 160A of the October 1954 issue of Tappi (a monthly publication of the Technical Association of Pulp and Paper Industry). The method measures the light reflectance of a clay sample and thus gives quantitative indication of its brightness or whiteness.

In the tables the brightness of the beneficiated clay and beneficiated disintegrated clay are reported below as bleached and unbleached materials, bleaching being accomplished with a conventional zinc hydrosulfite bleaching liquor. The brightness of these samples appear below compared to an average brightness, determined in the same fashion, of a kaolin of equivalent particle size distribution prepared by the conventional method of water-washing, fractionation and bleaching.

*Table III*

| Method of Preparation | Percent Weight | Percent Brightness Index | |
|---|---|---|---|
| | | Unbleached | Bleached |
| Conventional Washing and Bleaching | | | 81 |
| Feed to Flotation Unit | 100.0 | 76.8 | 80.5 |
| Beneficiated Clay | 75.8 | 81.1 | 85.2 |
| Disintegrated Beneficiated Clay | 75.8 | 83.0 | 90.2 |
| Fines (3.2 mic.) | 53.5 | 83.4 | 92.0 |
| Coarse (3.2 mic.) | 22.3 | 79.4 | 86.3 |

The above table demonstrates that my method of treating kaolin results in a brightness markedly superior to that achieved by either the conventional bleaching method for brightening clay or by flotation without subsequent disintegration of the beneficiated clay. The table also shows that when my flotation-disintegration treatment is followed by bleaching the resultant product has a brightness unmatched by methods heretofore known.

It will be understood that the invention is susceptible to numerous variations without departing from the spirit and scope of the invention.

I claim:

1. A method for improving the brightness of coarse kaolin clay comprising dispersing said clay in an aqueous medium to form an aqueous pulp of said clay, subjecting said aqueous pulp to negative-ion froth flotation treatment with a negative-ion reagent to thereby produce a froth-product material which is a concentrate of the colored impurities in the original clay and a machine discharge slurry including kaolin clay of improved brightness, forming said slurry into a flowing confined stream, vaporizing at least a portion of the liquid component of said stream to form a dispersion of clay particles in the resulting vapor and subjecting the dispersion to turbulence and high velocity whereby said particles impinge against one another and disintegrate to relatively fine particles of enhanced brightness.

2. The method of claim 1 wherein said negative-ion reagent comprises a fatty acid.

3. A method for improving the brightness of coarse kaolin clay comprising dispersing said clay in an aqueous medium to form an aqueous pulp of said clay, subjecting said aqueous pulp to negative-ion froth flotation treatment with a negative-ion reagent to thereby produce a froth-product material which is a concentrate of the colored impurities in the original clay and a machine discharge slurry of clay product, adjusting the solids content of said machine discharge slurry to about 15 to 40 percent by weight, forcing said slurry into and through an elongated zone of restricted cross-section, heating said slurry during passage through said zone to a temperature above the boiling point of the liquid component of said slurry at the pressure existing in said tube, vaporizing at least a portion of said liquid component during passage through said tube to form a dispersion of clay in the resultant vapor, subjecting the said dispersion to turbulence and high velocity whereby said particles impinge against one another and disintegrate to relatively fine particles of enhanced brightness.

4. The method of claim 3 including the additional steps of discharging the relatively fine particles into a stream of water to form a second slurry and subjecting said second slurry to hydraulic classification.

5. The method of claim 3 in which the flotation is carried out in the presence of at least one auxiliary agent selected from the group consisting of ammonium sulfate, magnesium sulfate and potassium sulfate.

6. The method of claim 3 wherein the solids content of said machine discharge slurry is adjusted with water.

7. The method of claim 3 wherein said negative-ion reagent comprises a fatty acid.

8. A method for improving the brightness of coarse kaolin clay comprising dispersing said clay in an aqueous medium to form an aqueous pulp of said clay, subjecting said aqueous pulp to negative-ion froth flotation in an aqueous pulp with a negative-ion reagent to thereby produce a froth-product material which is a concentrate of the color impurities in the original kaolin and a machine discharge kaolin product and simultaneously increasing the fineness and further enhancing the brightness of said machine discharge kaolin by forming a slurry of said machine discharge kaolin in a vaporizable liquid, passing said slurry into an initial portion of an elongated fluid conduit, heating said slurry in said fluid conduit to vaporize liquid and form a dispersion of said clay in hot vapor, passing said dispersion through a latter portion of said fluid conduit at high velocity in turbulent flow to cause particles of said clay to impinge against one another and disintegrate to relatively fine particles.

9. The method of claim 8 in which said coarse kaolin clay consists essentially of particles less than about 44 microns and greater than about 2 microns.

10. The method of claim 8 in which said coarse kaolin clay comprises particles within the range of from about 2 to 10 microns.

11. The method of claim 8 wherein said negative-ion reagent comprises a fatty acid.

12. A method for improving the brightness of kaolin clay comprising dispersing kaolin clay consisting essentially of particles finer than about 44 microns and coarser than about 2 microns in an aqueous medium to form an aqueous pulp of said clay, subjecting said aqueous pulp to froth flotation in an aqueous pulp with a negative-ion collector reagent selective to the colored impurities in the original kaolin clay to thereby produce a froth-product material which is a concentrate of the colored impurities in the original kaolin clay and a machine discharge kaolin clay product of enhanced brightness and, thereafter, simultaneously increasing the fineness and further enhancing the brightness of said machine discharge kaolin clay by forming an aqueous slurry of said machine discharge kaolin clay, passing said aqueous slurry into an initial portion of an elongated fluid conduit, heating said slurry in said conduit to vaporize water and form a dispersion of said kaolin clay in water vapor and passing said dispersion through a latter portion of said conduit at high velocity in turbulent flow to cause particles of said clay to impinge against one another and disintegrate to relatively fine particles.

13. The method of claim 12 including the additional steps of discharging said relatively fine particles from said latter portion of said condiut into a stream of water to form a second slurry and subjecting said second slurry to hydraulic classification.

References Cited in the file of this patent

UNITED STATES PATENTS

| | | |
|---|---|---|
| 2,303,962 | Tartaron et al. | Dec. 1, 1942 |
| 2,569,680 | Leek | Oct. 2, 1951 |
| 2,726,813 | Asdell | Dec. 13, 1955 |
| 2,735,787 | Eastman et al. | Feb. 21, 1956 |